Oct. 16, 1928.
P. E. HUSSEY
SAW GUARD
Filed Jan. 9, 1928
1,687,670
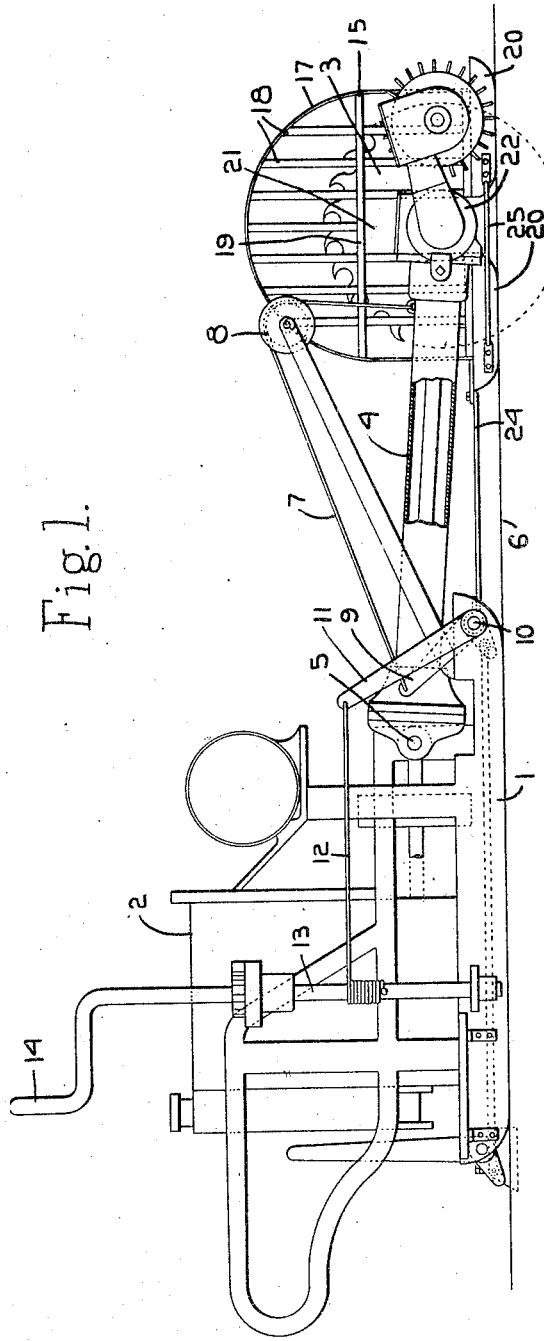
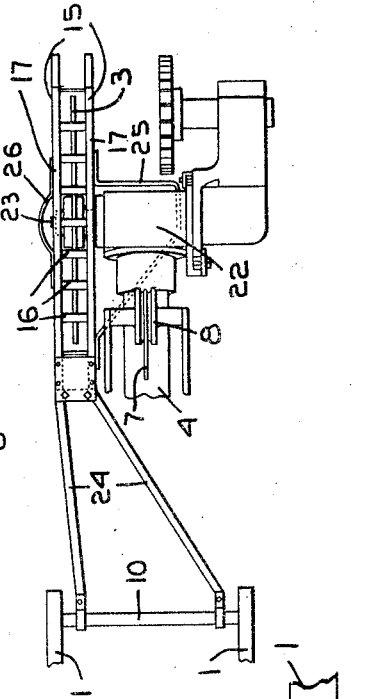
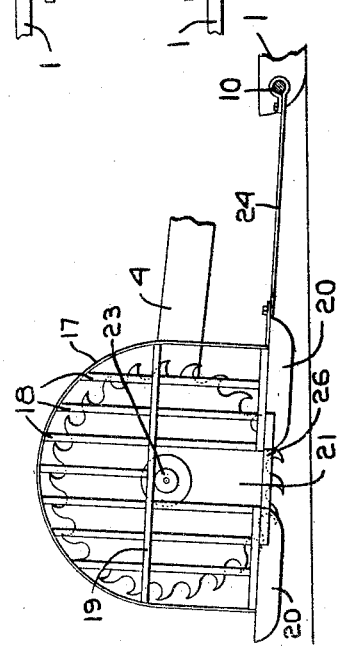
Inventor.
Pliny E. Hussey
by Heard Smith & Tennant.
Attys.

Patented Oct. 16, 1928.

1,687,670

UNITED STATES PATENT OFFICE.

PLINY E. HUSSEY, OF BEVERLY, MASSACHUSETTS.

SAW GUARD.

Application filed January 9, 1928. Serial No. 245,319.

This invention relates to saw guards and more particularly to a guard for an ice-cutting saw such as shown in my Patent No. 1,648,181, dated November 8th, 1927.

One of the objects of the present invention is to provide a novel saw guard for an ice-cutting saw of this type which will be effective in guarding the saw not only when it is in operation cutting the ice but also when it is raised into inoperative position.

Another object of the invention is to provide a novel saw guard which will not become clogged by the ice particles thrown up by the saw during its operation.

Other objects of the invention are to provide a saw guard having various novel features all as will be more fully hereinafter set forth.

In the drawings wherein I have illustrated a selected embodiment of my invention, Fig. 1 is a side elevation of an ice-cutting machine showing the saw guard in place, said figure illustrating the saw in working position;

Fig. 2 illustrates the position of the guard when the saw is raised from the work, said view showing the opposite side of the guard from that shown in Fig. 1;

Fig. 3 is a fragmentary plan view of the guard showing the method of attaching it to the machine.

The ice-sawing machine herein illustrated is similar to that shown in my above-mentioned Patent No. 1,648,181. This comprises a sled or carriage 1 on which is mounted a power plant 2, the latter preferably being in the form of an internal combustion engine. This power plant operates an ice-cutting saw 3 which is rotatably mounted in the end of a vertically-swinging tubular arm 4, said arm being pivoted to the frame at 5, all as described in said patent.

The saw is moved vertically to raise it from the ice 6 or to lower it into cutting position through the medium of a cord 7 which is attached to the tubular arm 4 and passes over a direction pulley 8 carried by the frame and leads to an arm 9 on a rock shaft 10, said rock shaft having another arm 11 thereon which is connected by a flexible connection 12 to a shaft 13 on which it is wound. This shaft is provided with a handle 14 for operating it and by means of this construction the arm 4 and the saw 3 can be raised and lowered all as shown in the above-mentioned patent.

My improved guard is constructed to enclose the saw both while it is in operative position shown in Fig. 1 and when it is in raised or inoperative position as shown in Fig. 2. The guard is in the form of a cage in which the saw is received and which is open at the bottom to permit the saw to be projected therefrom. The saw guard is mounted so that it can move vertically relative to the saw and it is provided with runners which rest on the ice when the saw is in its lowered or operative position, the saw at such time projecting through the open bottom of the guard and into the ice. When the saw is raised from the ice it will first move upwardly in the guard while the latter remains resting on the ice until the saw is entirely carried into the guard after which the guard will be lifted with the saw as shown in Fig. 2.

The guard comprises two similar side walls indicated generally at 15 which are located either side of the saw and which are connected by cross bars 16. The sides 15 have a skeleton or open-work formation, each side comprising a peripheral strip or band 17 and spaced bars or straps 18, said bars or straps being connected by the cross strap 19. These bars and straps 16, 17, 18 and 19 may be secured together in any suitable way either by riveting or welding and they provide a guard having open-work sides and a peripheral portion. The sides 15 are not connected at the lower edges thereby providing an opening in the bottom of the guard which is of a size to permit the saw to be projected therethrough. The guard has suitable runners 20 secured to its lower edge which rest on the ice and support the guard when the saw is in operation.

Each of the sides 15 is provided with an elongated opening 21 to receive the saw-supporting means, said opening permitting the guard to have a certain amount of vertical movement relative to the saw. The saw is mounted on a shaft which is journalled in a gear box or head 22 carried by the end of the arm 4 all as shown in the above-mentioned patent. One of the sides 15 of the guard is located between the saw 3 and the gear box 22 and the opening 21 in said side receives the portion of the shaft which extends between the gear box and the saw. The opening 21 in the other side receives the free end 23 of the saw shaft.

When the saw is lowered from the position shown in Fig. 2 to that shown in Fig. 1, the saw and guard will move downwardly together until the runners 20 of the guard rest on the ice 6, after which the saw is lowered relative to the guard and brought into its operative position, said saw being at this time projected through the open bottom of the guard. As stated above the openings 21 in the sides of the guard are of sufficient dimension to permit this relative movement of the saw and guard. When the saw is raised from the position shown in Fig. 1 to that shown in Fig. 2, the initial upward movement of the saw will be one relative to the guard 6. The guard is resting on the ice and will continue so to do until the saw has been carried up to a point where the saw shaft engages the top of the openings 21. Thereafter during the final upward movement of the saw the guard will be picked up by the saw and carried up therewith.

The size of the openings and the dimensions of the guard are such that when the saw is raised into a position where the saw shaft engages the upper sides of the openings as shown in Fig. 2 said saw will be drawn entirely into the guard and will be completely protected thereby.

The guard, therefore, will not be lifted from the ice during the raising of the saw until the saw is entirely enclosed in the guard and hence the saw is throughly guarded or protected at all times and in all positions.

The guard is maintained in proper position by means of a brace or strut member 24 which is connected to the rear end of the guard and is also connected to the rock shaft 10 of the sled or carriage. This connection 24 helps to maintain the guard in correct position relative to the saw.

A supplementary guard member 25 is provided on one side of the main guard, this being in the form of an iron which is attached to the runners 20 and is bent into the shape shown in Fig. 3. This supplementary guard extends under the gear box 22 and serves to prevent anything from getting between the surface of the ice and said gear box.

On the other side of the body of the guard is another supplementary guard 26 which connects the two runners 20 and forms the lower limit of the opening 21. These supplementary guards 25 and 26 are bowed outwardly from the main guard and serve to prevent any one's foot from slipping or getting caught under the saw between the runners.

Because of the open-work character of the guard there is no danger that it will become clogged up with particles of ice which are thrown up by the saw or will become frozen up by water thrown up by the saw. Such particles of ice and drops of water will be thrown through the guard instead of accumulating on the top thereof and thus there is very little likelihood that the guard will become clogged with ice.

I claim:

1. In an ice-cutting machine, the combination with vertically-movable saw-supporting means and a saw carried thereby, of a guard enclosing the saw and capable of vertical movement relative thereto, said guard resting on the ice when the saw is operatively cutting the ice and being supported by the saw-supporting means when the saw is raised from the ice.

2. In an ice-cutting machine, the combination with vertically-movable saw-supporting means and a saw carried thereby, of a guard enclosing the saw and capable of vertical movement relative thereto, said guard resting on the ice when the saw is operatively cutting the ice and being supported by the saw-supporting means when the saw is raised from the ice, the dimensions of the guard being such that it entirely encloses the saw when the latter is raised.

3. In an ice-cutting machine, the combination with vertically-movable saw-supporting means and a saw carried thereby, of a guard enclosing the saw and movable vertically relative thereto, said guard being constructed to rest on the ice when the saw is in cutting position and having an opening in its bottom through which the saw extends, and also being supported by the saw-supporting means when the saw is raised from the ice.

4. In an ice-cutting machine, the combination with vertically-movable saw-supporting means and a saw carried thereby, of a guard enclosing the saw and movable vertically relative thereto, said guard being constructed to rest on the ice when the saw is in cutting position and having an opening in its bottom through which the saw extends, and also being supported by the saw-supporting means when the saw is raised from the ice, the dimension of the guard being such that it entirely encloses the saw when the latter is in raised position.

5. In an ice-cutting machine, the combination with vertically-movable saw-supporting means and a saw carried thereby, of a guard enclosing the saw and adapted to have vertical movement relative thereto, said guard being provided with runners to rest on the ice when the saw is in lowered position and having an opening in its bottom through which the saw extends and also being supported by the saw-supporting means when the saw is raised from the ice.

6. In an ice-cutting machine, the combination with vertically-movable saw-supporting means and a saw carried thereby, of an open-work guard enclosing the saw and capable of vertical movement relative thereto, said guard resting on the ice when the saw is operatively cutting the ice and being supported by the saw-supporting means when the saw is raised from the ice.

7. In an ice-cutting machine, the combination with vertically-movable saw-supporting means and a saw carried thereby, of an openwork guard enclosing the saw and capable of vertical movement relative thereto, said guard resting on the ice when the saw is operatively cutting the ice and being supported by the saw-supporting means when the saw is raised from the ice, the dimensions of the guard being such that it entirely encloses the saw when the latter is raised.

8. The combination with a sled, of an arm pivoted thereto, a saw rotatably mounted on the arm, a motor on the sled for operating the saw, a guard enclosing the saw and capable of vertical movement relative thereto, said guard resting on the ice when the saw is in operative position and being supported by the arm when the saw is raised, and a connection between said guard and said frame.

9. The combination with a sled, of an arm pivoted thereto, a saw rotatably mounted on the arm, a motor on the sled for operating the saw, a guard enclosing the saw and capable of vertical movement relative thereto, said guard resting on the ice when the saw is in operative position and being supported by the arm when the saw is raised, a connection between said guard and said frame, and a strut member between said guard and frame which assists in holding the guard in proper position.

In testimony whereof, I have signed my name to this specification.

PLINY E. HUSSEY.